US009790000B1

(12) United States Patent
Holton (10) Patent No.: US 9,790,000 B1
(45) Date of Patent: Oct. 17, 2017

(54) CONTAINER APPARATUS FOR HOLDING SPORTSMAN ACCESSORIES

(71) Applicant: Hunt Strategy, LLC, Frankenmuth, MI (US)

(72) Inventor: James R. Holton, Holly, MI (US)

(73) Assignee: Hunt Strategy, LLC, Frankenmuth, MI (US)

( * ) Notice: Subject to any disclaimer, the term of this patent is extended or adjusted under 35 U.S.C. 154(b) by 0 days.

(21) Appl. No.: 14/337,909

(22) Filed: Jul. 22, 2014

Related U.S. Application Data

(60) Provisional application No. 61/857,198, filed on Jul. 22, 2013.

(51) Int. Cl.

| B65D 25/06 | (2006.01) |
|---|---|
| B65D 6/40 | (2006.01) |
| B65D 25/22 | (2006.01) |
| B65D 25/20 | (2006.01) |
| A01K 97/06 | (2006.01) |
| B63B 35/85 | (2006.01) |
| B65D 6/04 | (2006.01) |

(52) U.S. Cl.
CPC .............. *B65D 25/20* (2013.01); *A01K 97/06* (2013.01); *B63B 35/85* (2013.01)

(58) Field of Classification Search
CPC .......... B65D 25/20; A01K 97/06; B63B 35/85
USPC ....... 220/751, 628, 629, 630, 636, 543, 534, 220/544, 475, 480, 601
See application file for complete search history.

(56) References Cited

U.S. PATENT DOCUMENTS

| 795,484 | A | * | 7/1905 | Coble ........................... 220/630 |
| 2,663,449 | A | * | 12/1953 | Smart ....................... A21B 3/13 |
| | | | | 220/543 |
| 4,380,290 | A | * | 4/1983 | Luebke ...................... 206/315.1 |
| 4,750,695 | A | * | 6/1988 | Greenhouse .................... 248/99 |
| 4,957,254 | A | * | 9/1990 | Hill et al. ..................... 248/207 |
| 5,433,336 | A | * | 7/1995 | Kristoffersson ............. 220/531 |
| 5,476,188 | A | * | 12/1995 | Hassenpflug ................. 220/480 |
| 5,603,428 | A | * | 2/1997 | Breckwoldt ................... 220/755 |
| 5,636,818 | A | * | 6/1997 | Edwards et al. ............. 248/214 |
| 5,875,912 | A | * | 3/1999 | Hobson ....................... 220/4.03 |
| 6,454,124 | B1 | * | 9/2002 | Edwards et al. ............. 220/636 |
| 6,575,328 | B1 | * | 6/2003 | Foraker ....................... 220/739 |
| 2002/0092476 | A1 | * | 7/2002 | Vlach ....................... A01K 5/01 |
| | | | | 119/61.1 |
| 2006/0169705 | A1 | * | 8/2006 | Pool ............................. 220/629 |
| 2007/0152002 | A1 | * | 7/2007 | Dollar, Jr. .................... 224/404 |
| 2007/0176058 | A1 | * | 8/2007 | Kohn et al. .................. 248/100 |

(Continued)

*Primary Examiner* — J. Gregory Pickett
*Assistant Examiner* — Niki M Eloshway
(74) *Attorney, Agent, or Firm* — Holland & Hart LLP (57) ABSTRACT

A container apparatus for removable attachment is disclosed. The container includes a reception portion having a base and one or more dividing walls configured to separate items within the reception portion, and one or more brackets longitudinally adjustable along the holder, the brackets comprising hooks for selectively clasping ends of the elongated sides. The reception portion comprises integrally formed elongated sides extending from the base and end sides extending between the elongated sides to form an open container. The apparatus is configured to receive items therein allowing efficient exchange of sportsman items when coupled to a tree, tree stand or interior of a boat.

12 Claims, 8 Drawing Sheets

(56) References Cited

U.S. PATENT DOCUMENTS

2009/0250294 A1* 10/2009 Byers .......................... 182/129
2011/0290803 A1* 12/2011 Kehres ........................ 220/475

* cited by examiner

CONTAINER APPARATUS FOR HOLDING SPORTSMAN ACCESSORIES

CROSS-REFERENCE TO RELATED APPLICATIONS

This application claims the benefit of U.S. Provisional Application No. 61/857,198 filed Jul. 22, 2013 which is hereby incorporated herein by reference in its entirety, except that the present application supersedes any portion of the above referenced application which is inconsistent with the present application.

TECHNICAL FIELD

This disclosure relates to containers and sportsman accessories and more particularly to containers attachable to a tree or a fishing boat.

BACKGROUND

The statements in this section merely provide background information related to the present disclosure and may not constitute prior art.

Tree stands are amongst the most essential equipment for hunters, photographers and observers of wildlife. Observation in the tree stand decreases the possibility of being noticed by the animals or to obtain a higher vantage point than the ground from which to view animals. A tree stand allows a person to maintain a proximate position relative to the animals while at the same time decreasing the possibility of frightening or scaring off the animals. Additionally, by elevating a person above the ground, the tree stand can enable a person to see over low vegetation or other obstacles giving the person a better line of sight to an animal. In particular, bow hunters prefer tree stands because they generally prefer to be much closer to the animal than a hunter with a firearm and the features previously mentioned tend to allow the hunter a much closer shot.

Conventional tree stands typically include a platform suitable for at least one person to sit or stand so that the person is several feet above the ground (commonly six feet or more). Because these elevated platforms are used to hunt or view wild animals, tree stands are typically placed in relatively remote areas, many of which are also relatively inaccessible.

Tree stands generally come in four varieties: tower stands, climbing stands, ladder stands, and hang on stands. Although not mounted to a tree, a tower stand can be used in areas where there are no trees or the trees in that area are not suitable to mount a tree stand. The tower stand typically includes a plurality of legs which meet at the top to support a seat. This gives the hunter an elevated viewpoint without having to climb a tree.

Climbing stands typically include a pair of platforms that allow the hunter to maneuver up a tree to a desired height. Climbing stands generally have a lower climbing platform upon which the hunter stands and an upper climbing platform upon which the hunter sits. Each of the upper and lower climbing platforms has a toothed edge or jaw member for biting the front side of the tree and a cable or blade device attached to the climbing platform which encircles the backside of the tree, thereby supporting the climbing platform in a cantilevered position. The jaws or blades bite into the tree, by pivotal action of the climbing platform, to hold each climbing platform in place after the tree stand is located in the desired position on the tree. Each climbing platform may be released or repositioned by simultaneously raising or lifting the climbing platform while releasing the cable or blade device encircled about the tree to disengage the climbing platform.

Hang on stands typically include a seat and a footrest that is attached to the tree. This type of tree stand is relatively lightweight and allows reasonable portability. However, the hunter is required to climb the tree by, for example, installing climbing steps, using a climbing stick, or climbing up limbs.

A ladder stand typically includes a ladder with a seat at the top. The entire assembly is then secured to the tree such that the hunter can climb the ladder to get into and out of the tree stand.

While using a tree stand, a user typically will have many items of gear. The hunter, for example, may have binoculars, range finder, and a weapon, food or mobile device. When an animal comes into view the hunter will need to switch items. Conventionally, a tree stand user will use clothing pockets or hope to hang items on a tree branch. Unsurprisingly, this is an undesirable solution. Therefore, it would be advantageous to have a mountable container to hold and receive items enabling a user to efficiently and quietly switch and set items when in a sporting environment such as in a tree stand or fishing boat.

SUMMARY

A container apparatus for removable attachment is disclosed. The container includes a reception portion having a base and one or more dividing walls configured to separate items within the reception portion, and one or more brackets longitudinally adjustable along the holder, the brackets comprising hooks for selectively clasping ends of the elongated sides. The reception portion comprises integrally formed elongated sides extending from the base and end sides extending between the elongated sides to form an open container. The apparatus is configured to receive items therein allowing efficient exchange of sportsman items when coupled to a tree, tree stand or interior of a boat.

The apparatus may be mountable to a tree or tree stand in an elevated position in a hunting or other observation area. In one embodiment, the apparatus includes a reception portion configured to receive items therein, and one or more brackets configured to enable selective coupling to a tree or a tree stand and one or more dividing walls configured to separate items within the reception portion. The brackets are preferably longitudinally adjustable along an exterior of the apparatus enabling a secure coupling to various side tree trunks.

Certain embodiments of the invention include a feature of a mesh base configured to enable weather elements to pass therethrough.

In some embodiments, a cup holder may be included or formed of the apparatus.

In some embodiments, the apparatus may also include one or more hooks for hanging accessory equipment on.

In some embodiments, the apparatus is attachable to an interior of a boat.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. The word "exemplary" is used herein to mean "serving as an example, instance, or illustration." Any embodiment described herein as "exemplary" is not necessarily to be construed as preferred or advantageous over other embodiments.

Spatially relative terms, such as "under", "below", "lower", "over", "upper", "top" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "forward" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Embodiments of a container apparatus 10 for holding sportsman accessories 10 for a structure such as a tree, tree stand, or boat are disclosed herein. When utilized in a sportsman environment, the container apparatus 10 is intended be respectively secured in an elevated position to a corresponding plurality of trees or tree stand in a hunting area or other observation area. The container apparatus 10 can include a hollow or open reception portion 12 configured to receive items therein, and one or more brackets 14 configured to enable coupling to a tree or a tree stand. In various embodiments, the container apparatus 10 may be attached to any type of structure or apparatus including, e.g., a hunting stand, tree, or fishing boat. The disclosure herein is not intended to be limited to the particular items, apparatus, or structures described as examples for the container apparatus 10 to be attached.

As shown, the brackets 14 are configured to receive a ratchet strap or strap which may then be secured around the tree trunk or tree stand frame structure. To receive a strap, the brackets have, in one embodiment, vertically-aligned slender apertures 11.

Figure 1:
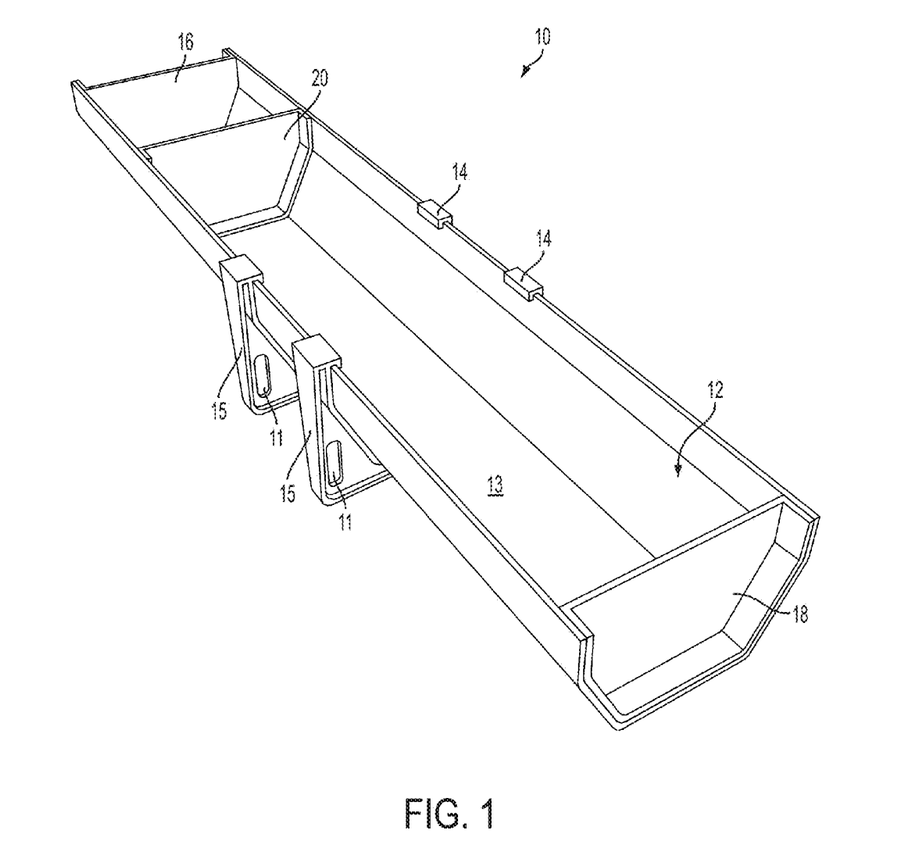
FIG. 1 shows a top perspective view of the accessory holder, in accordance with the present disclosure.

In one embodiment, the brackets 14 are longitudinally moveable along the exterior housing of the container apparatus 10, e.g., axis A, as illustrated in FIG. 1. In this way, a user may preferential place the brackets 14 for secure engagement to various structures including various diameter tree trunks and a frame of a tree stand. The brackets 14 may be configured to selectively fixably couple to the exterior housing of the container apparatus 10. In one embodiment, the coupling means are simply bolts extending through corresponding holes or openings formed in the brackets and the housing. In one embodiment the coupling means may include adjustable screw mechanism such as a wing-bolt configured to engage an exterior of the housing securing the brackets 14 via frictional force.

Figure 2:
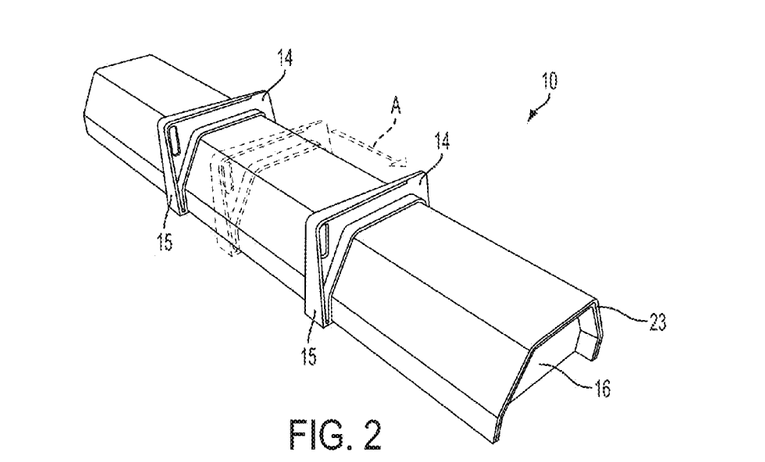
FIG. 2 shows a bottom perspective view of the accessory holder, in accordance with the present disclosure.
Figure 3:
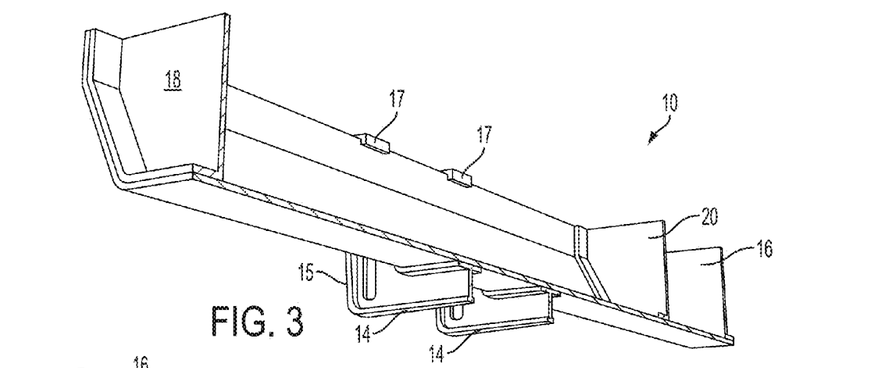
FIG. 3 shows a cross-sectional view of the accessory holder, in accordance with the present disclosure.
Figure 4:
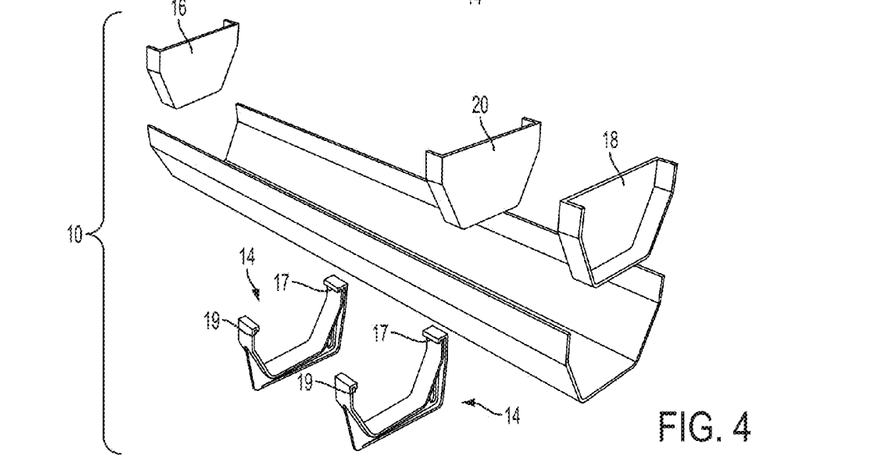
FIG. 4 shows an exploded view of the accessory holder, in accordance with the present disclosure.
Figure 5:
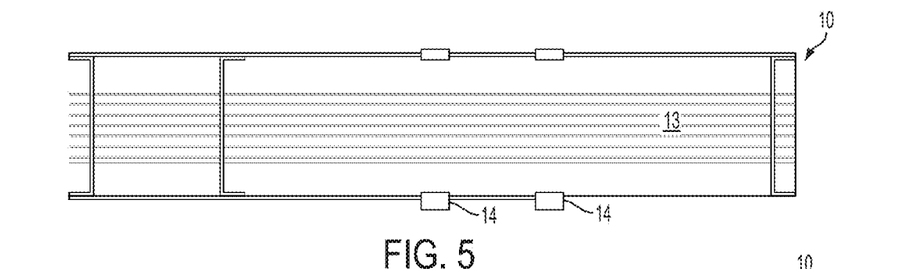
FIG. 5 shows a top view of the accessory holder, in accordance with the present disclosure.
Figure 6:
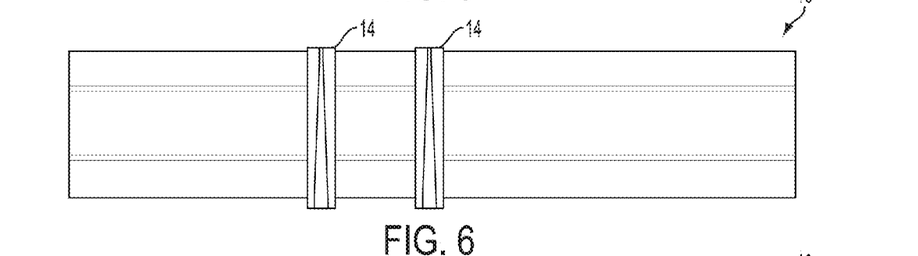
FIG. 6 shows a bottom view of the accessory holder, in accordance with the present disclosure.
Figure 7:
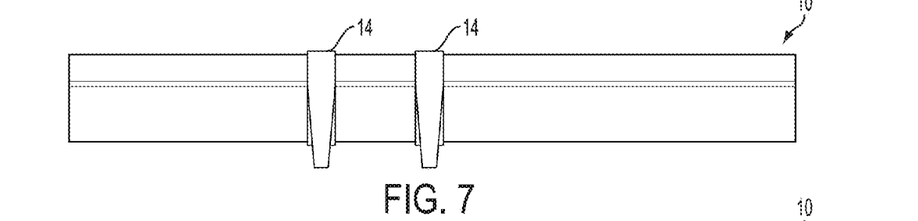
FIG. 7 shows a front view of the accessory holder, in accordance with the present disclosure.
Figure 8:
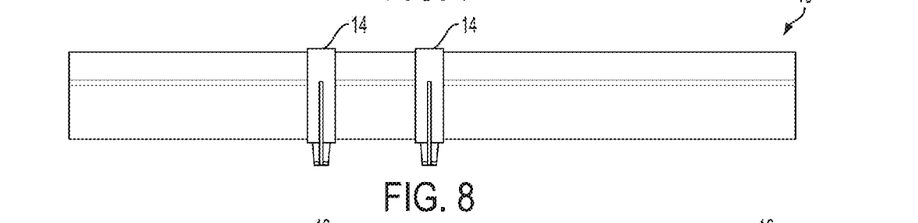
FIG. 8 shows a back view of the accessory holder, in accordance with the present disclosure.
Figure 9:
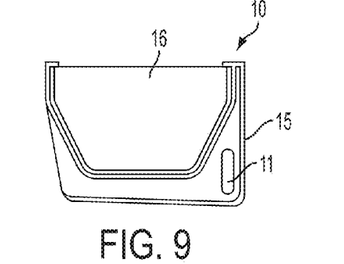
FIG. 9 shows a side view of the accessory holder as shown from a left side of FIG. 7, in accordance with the present disclosure.
Figure 10:
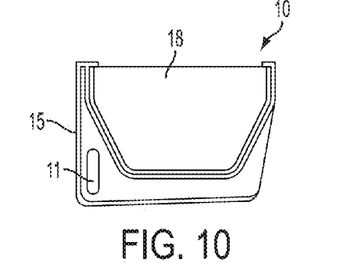
FIG. 10 shows a side view of the accessory holder as shown from a right side of FIG. 7, in accordance with the present disclosure.

As shown in FIGS. 2 and 3, the coupling means are a first and second hook 17 and 19, respectively. The hooks 17 and 19 are configured to selectively clasp ends 25 and 27 of the elongated sides 21 and 23, respectively. In one embodiment, the brackets 14 are integrally formed of the container apparatus 10.

It is contemplated by the disclosure herein, that the container apparatus 10 may be formed of one or more suitable materials of sufficiently rigidity and durability. In one embodiment the container apparatus 10 may be manufactured from metal or plastic using any known process or material including plastic-based polymers from an injection molding manufacturing process, although other manufacturing processes are contemplated by this disclosure including blow molding and fabrication processes. The reception portion 12 is preferably integrally formed into a contiguous structure; however it is contemplated by the disclosure herein that portions of the apparatus may be separately coupled together such as the side portions 16 and 18 and a dividing portion 20 as shown in FIG. 11.

Figure 11:
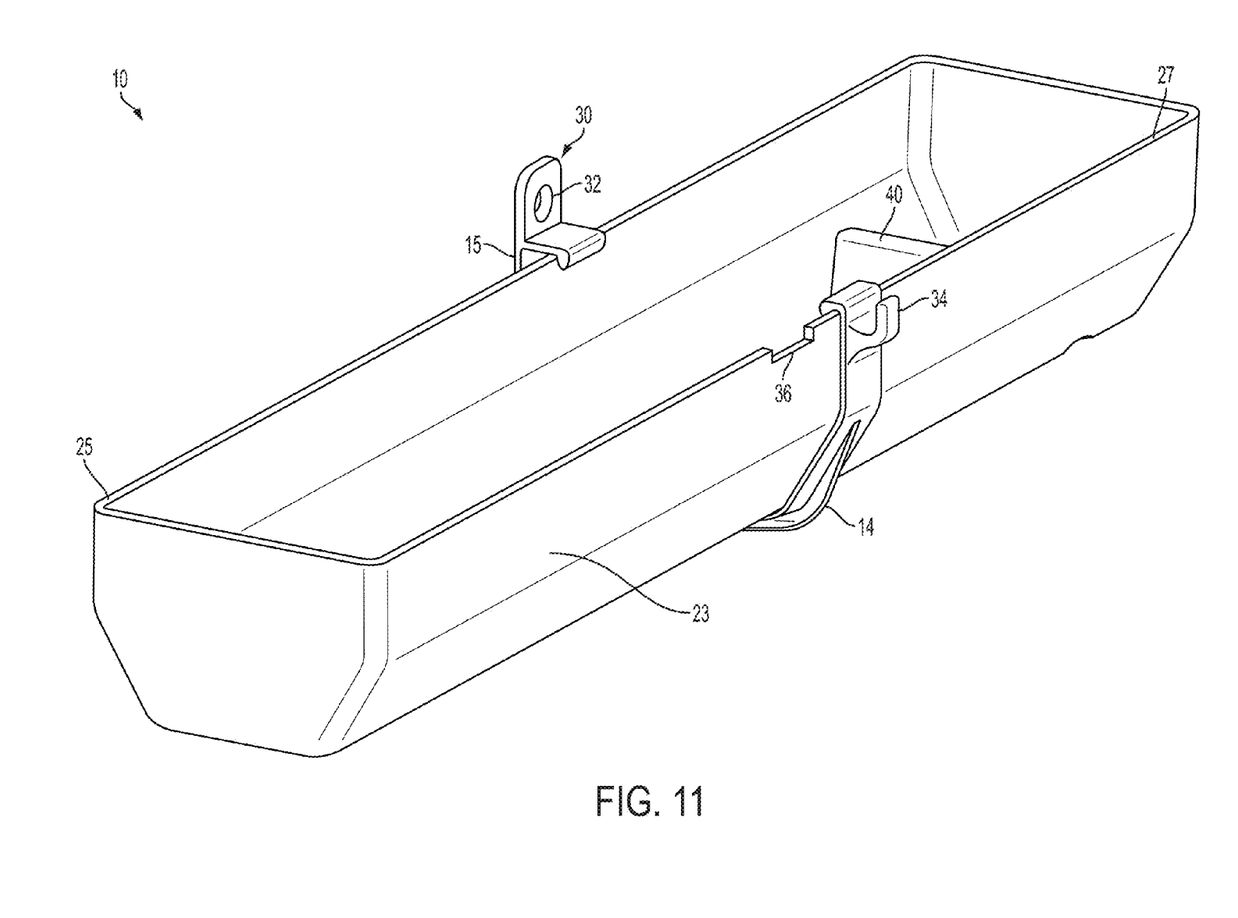
FIG. 11 shows a top perspective view of an embodiment of the accessory holder, in accordance with the present disclosure.
Figure 15:
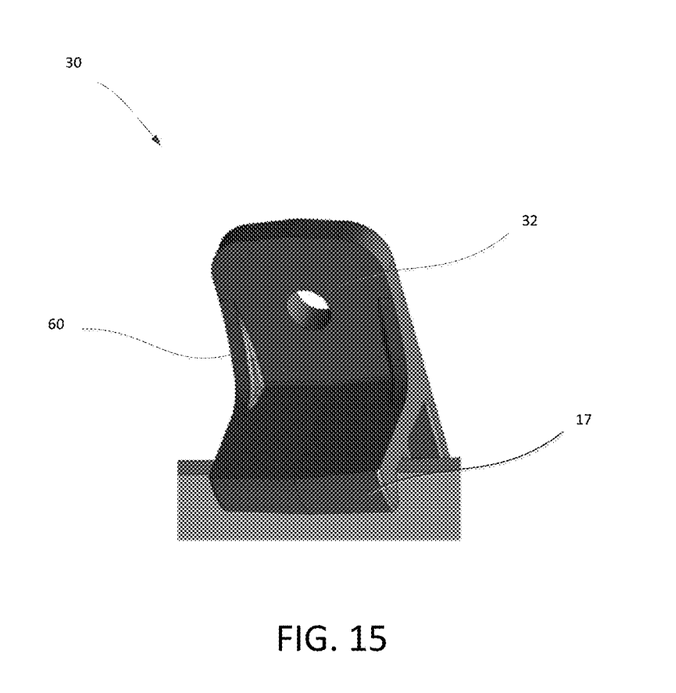
FIG. 15 shows a tab integrally to a bracket of the accessory holder, in accordance with the present disclosure.

FIG. 11 shows an embodiment of the container apparatus 10. As FIG. 11 shows, the container apparatus 10 includes a bracket 14 having a tab 30 flush with a bracket side 15, the tab having an aperture 32. The tab 30 is preferably integrally formed of the bracket 14 and includes gussets 60 that connect to the hook portion 17. The gussets 60 for provide support to the bracket 14. FIG. 15 shows an embodiment of the tab 30 having exemplary gussets 60.

The container apparatus 10 may also include one or more hooks for hanging accessory equipment on. In one embodiment, the brackets 14 have a forward facing hook 34 for hanging accessories. In some embodiments of the container apparatus 10, an indentation 36. The indentation 36 is used to assist separation of the brackets 14 from the container apparatus 10. The indentation 36 provides additional clearance for removal and engagement of the brackets 14 to the container apparatus 10. An integrally connected dividing wall 40 is shown in the embodiment of FIG. 11; however, the dividing wall may be removable as described herein above.

Figure 12:
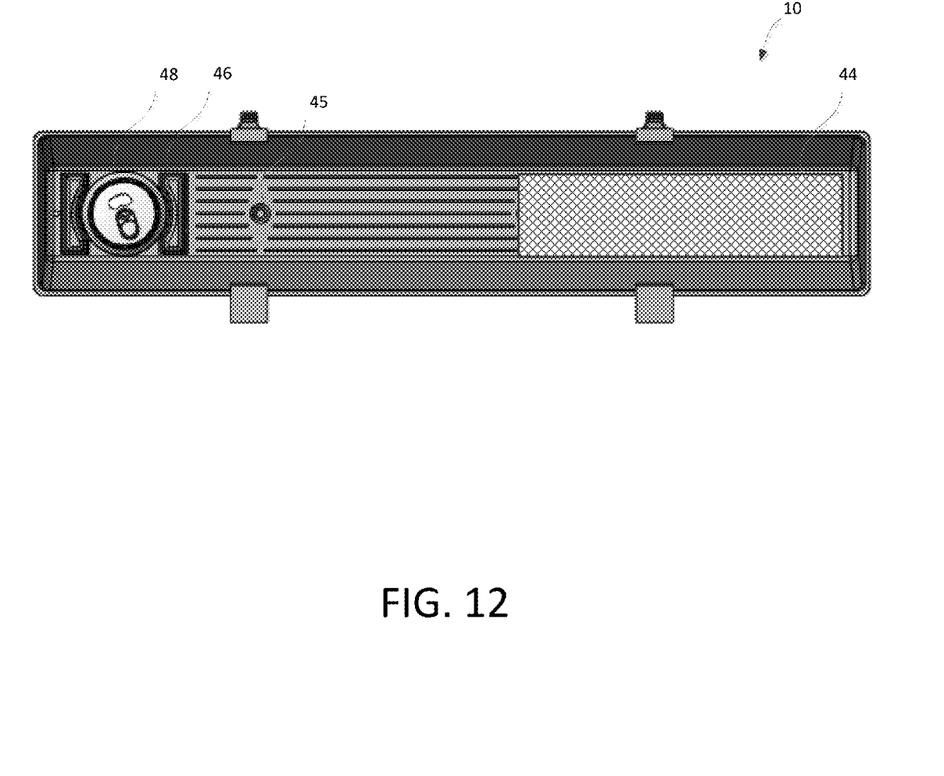
FIG. 12 shows a top view of an embodiment of the accessory holder, in accordance with the present disclosure.

FIG. 12 shows a further embodiment of the container apparatus 10. As FIG. 12 shows, the container apparatus 10 may include a cup holder 46 for securing a cup or can 48. The cup holder 46 may be integrally formed of the container apparatus 10 or removably connected. In some embodiment, the base 13 is foraminous formed of a mesh structure 44 having a plurality of openings and/or one or more apertures 45. Utilizing a mesh 44 and/or one or more apertures on the base 13, the container apparatus 10 may be left outside enabling rain water or other elements to pass through uncollected.

Figure 13:
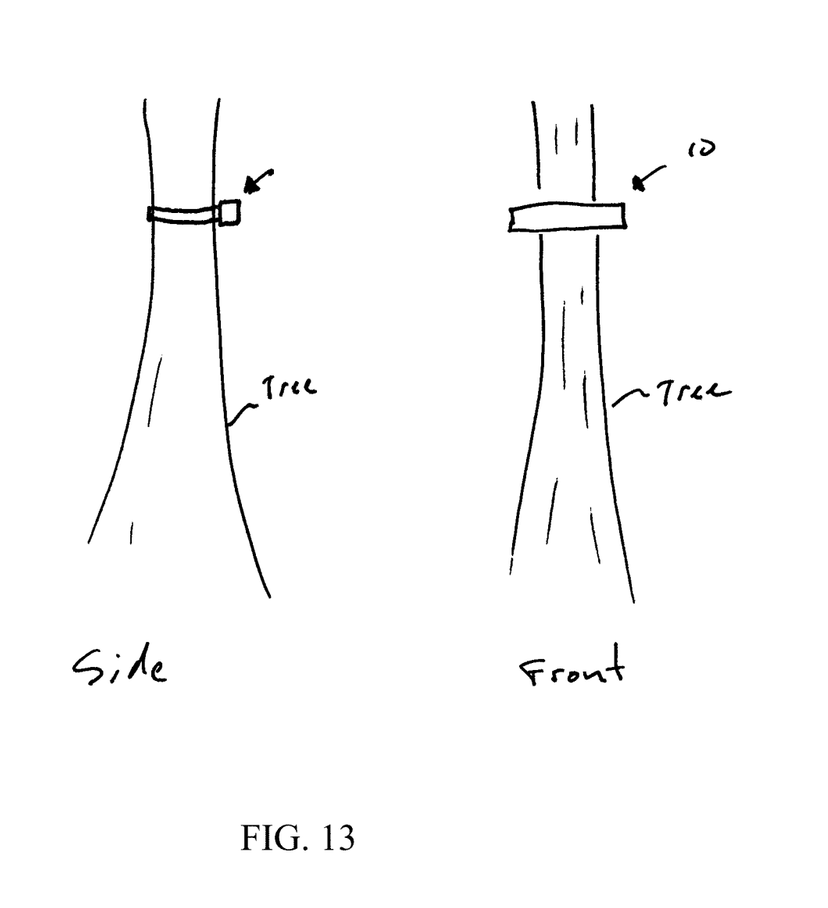
FIGS. 13 and 14 show exemplary applications of the accessory holder, in accordance with the present disclosure.
Figure 14:
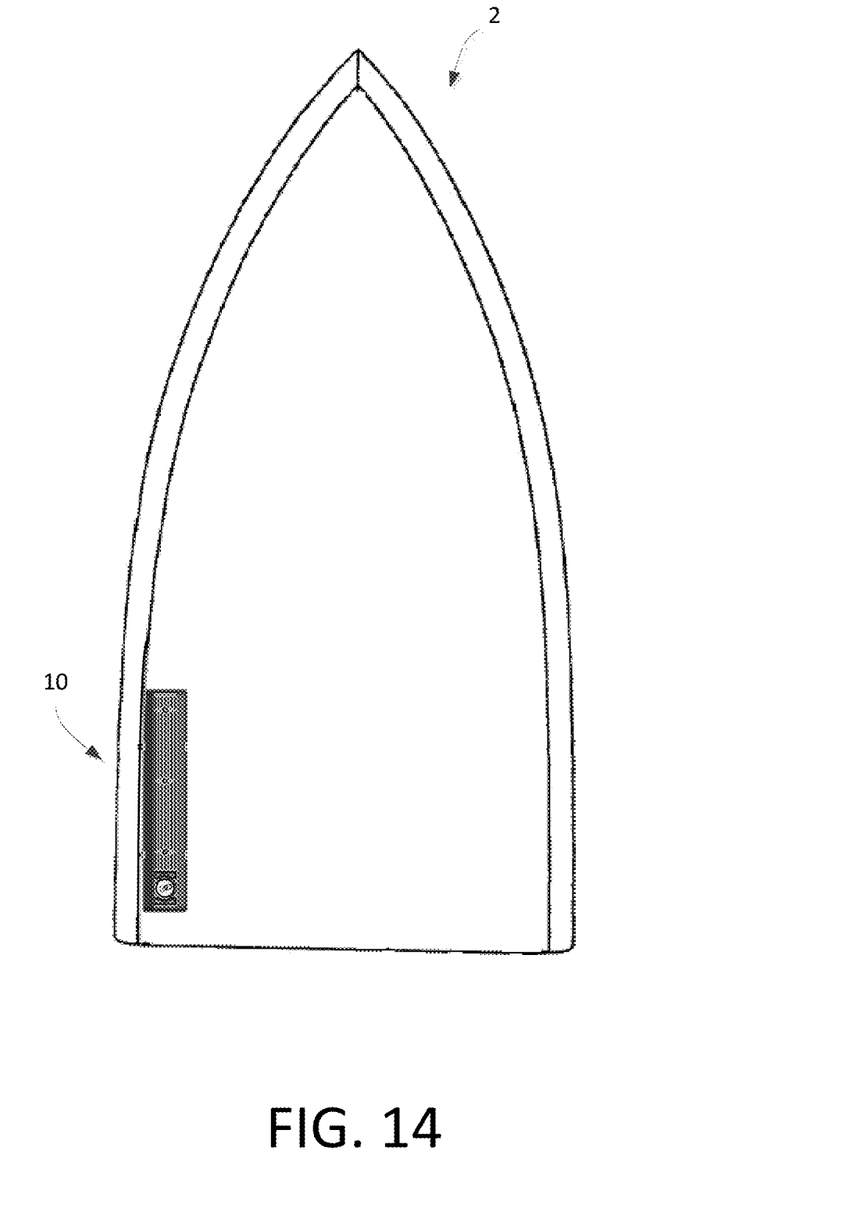

FIGS. 13 and 14 show exemplary applications of the accessory holder 10. As FIGS. 13 and 14 show, the container apparatus 10 may be attached to an tree. A strap 50 secured through the brackets 14, holds the container apparatus 10 in an elevated position with respect to the ground. The hunter may then have ready access to his gear including, e.g., binoculars, range finder, and a weapon, food or mobile device. When an animal comes into view the hunter will be able to quickly and quietly switch items.

FIG. 14 shows the container apparatus 10 secured to a side of a boating vessel 2. As FIG. 14 shows, the container apparatus 10 may be secured to an interior ledge or rim of the boating vessel 2. This will enable a sportsman, such as a fisherman, to have ready access to his gear.

The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

The invention claimed is:

1. A container apparatus for removable attachment, the container apparatus comprising:
    a reception portion having a base, elongated sides integrally formed with the base and extending from the base, and end sides extending between the elongated sides to form an open container, the base comprising a plurality of openings extending between an interior of the reception portion and an exterior of the reception portion, the plurality of openings being configured to allow fluid to pass through the base;
    one or more dividing walls positioned within the reception portion, the one or more dividing walls being positionable at any position along a length of the base, the one or more dividing walls being configured to separate items within the reception portion; and
    one or more brackets longitudinally adjustable along the reception portion, the brackets comprising: a hook selectively clasping an end of at least one of the elongated sides and a tab integrally formed to the hook, the tab being flush with a bracket side and extending upward relative to the end of the at least one of the elongated sides, the tab having an aperture and gussets integrally formed to the hook.

2. The container apparatus of claim 1, wherein the brackets further comprise: a vertically-aligned slender aperture for receiving a strap.

3. The container apparatus of claim 1, wherein the brackets further comprise: a second hook for selectively clasping the elongated sides.

4. The container apparatus of claim 1, wherein the brackets further comprise: an additional hook facing away from an interior of the reception portion.

5. The container apparatus of claim 1, wherein the one or more dividing walls configured to separate items within the reception portion are selectively moveable.

6. The container apparatus of claim 1, wherein one of the elongated sides includes an indentation.

7. The container apparatus of claim 1, wherein the reception portion is symmetrical across a longitudinal axis.

8. A fixable accessory container apparatus for removable attachment, the container apparatus comprising:
- a reception portion having a foraminous base, one or more integrally formed dividing walls, elongated sides integrally formed with the base and extending from the base, and end sides extending between the elongated sides to form an open container, wherein at least one of the elongated sides includes an indentation, wherein the base includes an integrally formed cup holder, the foraminous base comprising a plurality of openings that extend between an interior of the reception portion and an exterior of the reception portion, the plurality of openings being configured to allow fluid to pass through the foraminous base; and
- one or more brackets longitudinally adjustable along the reception portion, the brackets comprising:
- a first and second hook for selectively clasping ends of the elongated sides;
- a vertically-aligned slender aperture for receiving a strap;
- a third hook facing away from an interior of the reception portion; and
- a tab integrally formed to the first hook, the tab being flush with a bracket side and extending upward relative to the ends of the elongated sides, the tab having an aperture and gussets integrally formed to the first hook.

9. The container apparatus of claim 8, wherein the one or more dividing walls configured to separate items within the reception portion are selectively moveable.

10. The container apparatus of claim 8, wherein the reception portion is symmetrical across a longitudinal axis.

11. A method for using a fixable accessory container apparatus for removable attachment, the method comprising:
- providing a container apparatus comprising:
  - a reception portion having a foraminous base, one or more integrally formed dividing walls, elongated sides integrally formed with the base and extending from the base, and end sides extending between the elongated sides to form an open container, wherein at least one of the elongated sides includes an indentation, the foraminous base comprising a plurality of openings through the base of the reception portion, the plurality of openings being configured to allow fluid to pass through the foraminous base; and
  - one or more brackets longitudinally adjustable along the reception portion, the brackets comprising:
  - a first and second hook for selectively clasping ends of the elongated sides;
  - a vertically-aligned slender aperture for receiving a strap;
  - a third hook facing away from an interior of the reception portion; and
  - a tab integrally formed to the first hook, the tab being flush with a bracket side and extending upward relative to the ends of the elongated sides, the tab having an aperture and gussets integrally formed to the first hook; and
- removably attaching the container apparatus to a surface.

12. The method of claim 11, wherein the surface is one of a tree trunk, a hunting stand, or a boat ledge.

* * * * *